(12) United States Patent
Hsu

(10) Patent No.: US 8,967,569 B2
(45) Date of Patent: Mar. 3, 2015

(54) SUPPORT STRUCTURE

(75) Inventor: Yu-Tsun Hsu, New Taipei (TW)

(73) Assignee: Jarllytec Co., Ltd., New Taipei (TW)

( * ) Notice: Subject to any disclaimer, the term of this patent is extended or adjusted under 35 U.S.C. 154(b) by 406 days.

(21) Appl. No.: 13/413,332

(22) Filed: Mar. 6, 2012

(65) Prior Publication Data

US 2012/0273449 A1 Nov. 1, 2012

(30) Foreign Application Priority Data

Apr. 28, 2011 (TW) .............................. 100114789 A

(51) Int. Cl.
*E04G 3/00* (2006.01)
*G06F 1/16* (2006.01)
*F16M 11/10* (2006.01)
*F16M 11/20* (2006.01)

(52) U.S. Cl.
CPC ............ *F16M 11/10* (2013.01); *F16M 11/2021* (2013.01); *F16M 2200/044* (2013.01); *Y10S 248/917* (2013.01); *Y10S 248/918* (2013.01); *Y10S 248/919* (2013.01); *Y10S 248/92* (2013.01); *Y10S 248/922* (2013.01); *Y10S 248/923* (2013.01)
USPC .................. 248/284.1; 248/291.1; 248/283.1; 248/292.12; 248/292.13; 248/282.1; 248/917; 248/918; 248/919; 248/920; 248/922; 248/923; 248/371; 248/372.1; 248/393; 248/394; 248/395; 248/396; 248/397; 361/679.22; 361/679.02; 16/366; 16/233; 16/235; 16/236; 16/237; 16/239

(58) Field of Classification Search
USPC ................. 248/284.1, 291.1, 291.11, 292.12, 248/292.13, 282.1, 283.1, 917–923, 371, 248/372.1, 393–397; 361/679.22, 679.02; 16/366, 233, 235–237, 239
See application file for complete search history.

(56) References Cited

U.S. PATENT DOCUMENTS

| 7,431,254 | B2 * | 10/2008 | Cheng ....................... 248/292.12 |
| 7,967,260 | B2 * | 6/2011 | Hsu ............................... 248/133 |
| 2009/0134286 | A1 * | 5/2009 | Lee et al. .................... 248/125.1 |
| 2010/0006730 | A1 * | 1/2010 | Hsu ........................... 248/346.06 |

* cited by examiner

*Primary Examiner* — Christopher Garft
(74) *Attorney, Agent, or Firm* — Guice Patents PLLC

(57) ABSTRACT

The present invention relates to a support structure. A main hinge of the structure is installed with a stop mechanism, so when an object to be supported is placed at a higher location while being in an unfolding state, the object to be supported is restrained from being rotated from a vertical state to a horizontal folding state, thereby preventing falling due to the unstable gravity center; when a connection unit is folded towards a base, an upper end of a first auxiliary connection member links the stop mechanism to rotate for gradually altering the stopping location, so the object to be supported is enabled to be horizontally folded; as such, the object to be supported can be maintained in a stable state during the folding process, thereby preventing the occurrence of falling.

11 Claims, 13 Drawing Sheets

SUPPORT STRUCTURE

BACKGROUND OF THE INVENTION

1. Field of the Invention

The present invention relates to a support structure, especially to a support structure with a foldable function.

2. Description of Related Art

A conventional flat monitor, such as a liquid crystal monitor, liquid crystal television or plasma television, has advantages of light in weight, thin in thickness and having no radiation, thereby being used to replace the CRT monitor which is heavy in weight and large in volume. As such, a support structure is a must-have accessory for the flat monitor. However, the flat monitor has a limitation of viewing angle, so at least a hinge structure is installed between the monitor and a base, thereby enabling the elevation angle of the flat monitor to be adjusted relative to the base.

However, the base is not equipped with functions of lifting or forwardly/backwardly moving the flat monitor. The skilled people in the art have developed an auxiliary connection member which is installed in parallel, e.g. end parts of two connection rods being respectively connected to a main hinge at the upper end of a connection unit and a base hinge at the lower end. Take the China Patent No. 1244852C (corresponding to the U.S. Pat. No. 6,822,857), issue on the 8th of Mar., 2006, titled in "Monitor improved in a tilting structure" for example; according to FIG. 5 disclosed in the patent, the components numbered as 100 and 110 are a pair of auxiliary connection members arranged in parallel, wherein a pair of auxiliary connection members at one lateral side of a connection unit, a main hinge and a base hinge jointly form a parallel four-bar linkage mechanism, such that the auxiliary connection members are enabled to convert the rotation motion of the connection unit relative to the base unit into the inclined motion of a monitor main body. In other words, when the height of the monitor main body is desired to be adjusted, and the connection unit inclines the monitor main body along the up/down direction, only the second and the third friction springs (sleeves) connected with the main rack would rotate around the third and the fourth hinges, thereby maintaining the original angle of the monitor main body during the displacement.

For a flat monitor manufacturer to reduce the volume during transportation, before the object to be supported, the connection unit and the base are packed, the above three have to be in a folding state for lowering the height to the minimum. Generally, a rotary state is formed between the connection unit and the main hinge of a conventional support structure, if the object to be supported, e.g. a flat monitor, is placed at a higher location while the support structure is in the unfolding state, and the flat monitor is desired to be rotated from a vertical state to a horizontal folding state, because the gravity center of the flat monitor is shifted, the support structure is more likely to fall or even cause damage to the flat monitor, therefore the inconvenience generated while the manufacturer or user processes the folding operation shall be improved.

SUMMARY OF THE INVENTION

One primary objective of the present invention is to provide a support structure, in which a main hinge pivoted at an upper end of a connection unit is installed with a stop mechanism, so when an object to be supported is placed at a higher location while being in an unfolding state, the object to be supported is restrained from being rotated from a vertical state to a horizontal folding state due to the stop function provided by the stop mechanism; when the support structure is desired to be folded, a non-parallel four-bar linkage mechanism formed through a first auxiliary connection member, a base hinge, the main hinge and the connection unit can drive the stop mechanism to rotate thereby gradually altering to the stopping location, and the object to be supported is enabled to be horizontally folded; as such, the object to be supported can be maintained in a stable state during the folding process, thereby preventing the occurrence of falling.

For achieving the objective, one technical solution provided by the present invention is to provide a support structure, which comprises:

a connection unit, having an upper and a lower ends;

a base;

at least a base hinge, each base hinge utilizes a fixed shaft rod to be respectively pivoted at the lower end of the connection unit and a lower rack installed on the base, so the inclined angle of the connection unit is able to be adjusted relative to the base, and the fixed shaft rod is additionally installed with at least a first and at least a second lower shaft rings;

at least a main hinge, each main hinge utilizes a moveable shaft rod to be respectively pivoted at the upper end of the connection unit and an upper rack connected with an object to be supported, so the elevation angle of the upper rack is able to be adjusted relative to the connection unit; wherein the moveable shaft rod is installed with at least a first upper shaft ring and at least a second upper shaft ring capable of being linked with the moveable shaft rod, and the upper rack and the adjacent first upper shaft ring are oppositely formed with a first adjustment slot and a first stop tenon, the first stop tenon is inserted in the first adjustment slot for serving as a stop for the upper rack;

at least a first auxiliary connection member, installed in parallel at at least one side of the connection unit, an upper and a lower ends of each first auxiliary connection member are respectively pivoted in an upper an a lower connection holes formed at the peripheries of the first upper and the first lower shaft rings, and the distance defined from the lower connection hole to the center point of the fixed shaft rod is greater than the distance defined from the upper connection hole to the center point of the moveable shaft rod; and at least a pair of second auxiliary connection members, disposed adjacent to the first auxiliary connection member, and installed in parallel at at least one side of the connection unit, an upper and a lower ends of each pair of second auxiliary connection members are respectively pivoted in a pair of upper and lower connection holes oppositely and radially formed on the second upper and the second lower shaft rings, and the distance between each pair of lower connection holes is the same as the distance between each pair of upper connection holes;

when the connection unit is folded towards the base, the first auxiliary connection member reversely links the first upper shaft ring to rotate for gradually altering the stopping location, and the second auxiliary connection members enable the second upper shaft ring to reversely rotate for keeping the original angle and drive the upper rack to keep the original angle during the folding process.

Another technical solution provided by the present invention is to provide a support structure, which comprises:

a connection unit, having an upper and a lower ends;

a base;

at least a base hinge, each base hinge utilizes a fixed shaft rod to be respectively pivoted at the lower end of the connection unit and a lower rack installed on the base, so the inclined angle of the connection unit is able to be adjusted relative to the base, and the fixed shaft rod is additionally installed with at least a first lower shaft ring;

at least a main hinge, each main hinge utilizes a moveable shaft rod to be respectively pivoted at the upper end of the connection unit and an upper rack connected with an object to be supported, so the elevation angle of the upper rack is able to be adjusted relative to the connection unit; wherein the moveable shaft rod is installed with at least a first upper shaft ring, and the upper rack and the adjacent first upper shaft ring are oppositely formed with a first adjustment slot and a first stop tenon, the first stop tenon is inserted in the first adjustment slot for serving as a stop for the upper rack;

at least a first auxiliary connection member, installed in parallel at at least one side of the connection unit, an upper and a lower ends of each first auxiliary connection member are respectively pivoted in an upper an a lower connection holes formed at the peripheries of the first upper and the first lower shaft rings, and the distance defined from the lower connection hole to the center point of the fixed shaft rod is greater than the distance defined from the upper connection hole to the center point of the moveable shaft rod; and when the connection unit is folded towards the base, the upper end of the first auxiliary connection member reversely links the first upper shaft ring to rotate for gradually altering the stopping location, so the upper rack is enabled to gradually and reversely rotate to a horizontal folding state relative to the connection unit.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
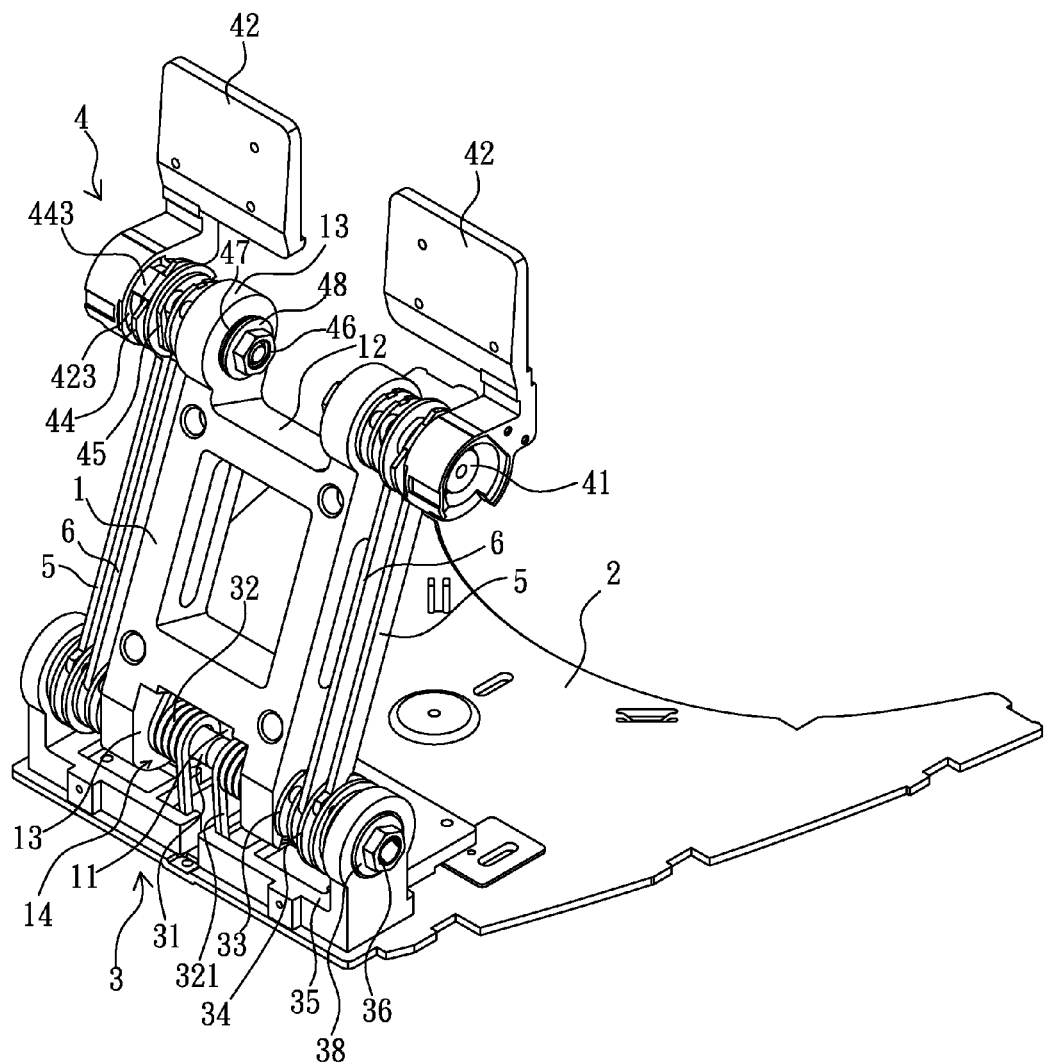
FIG. 1 is a perspective view illustrating the support structure according to the present invention.
Figure 2:
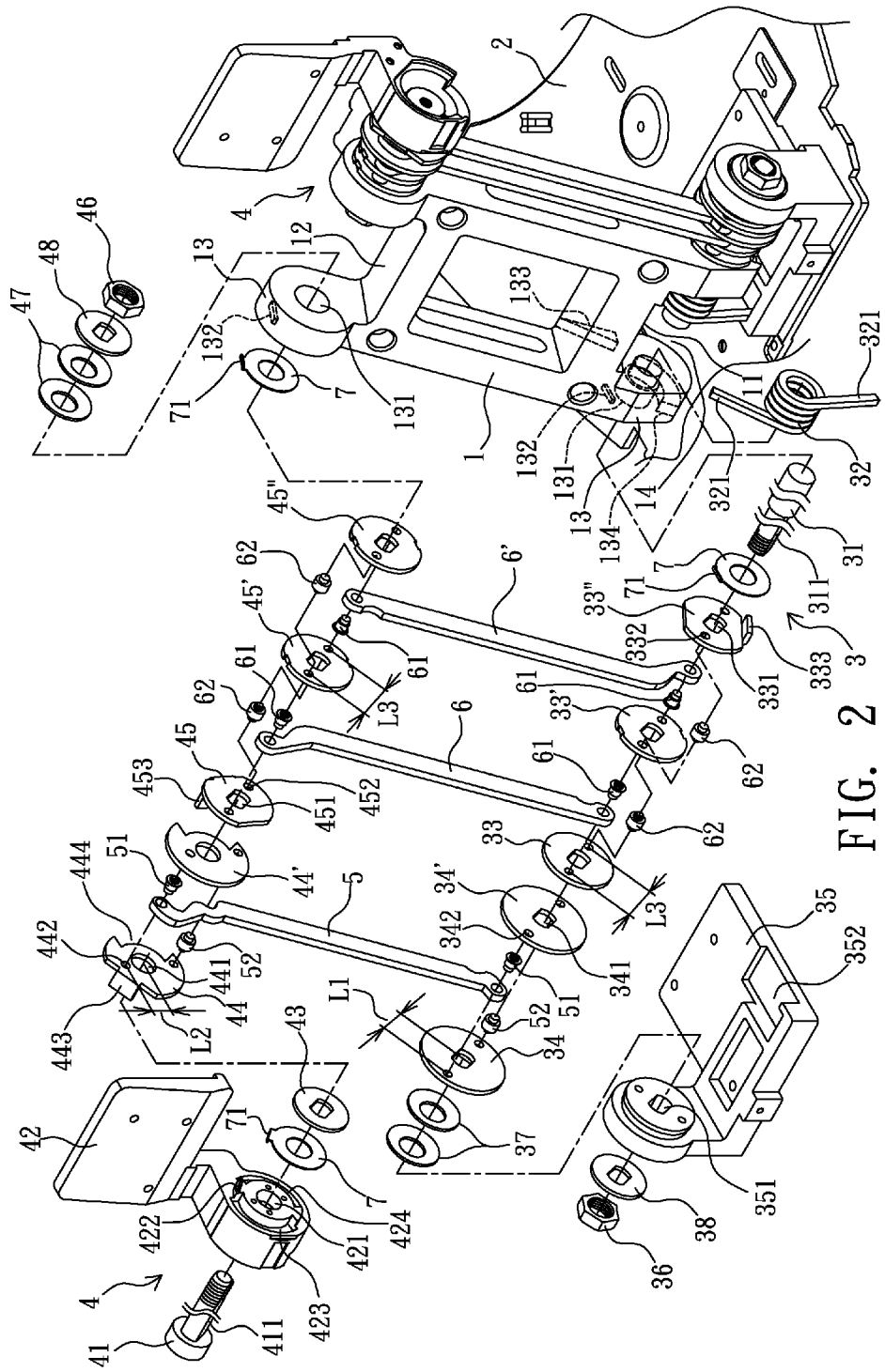
FIG. 2 is a perspective exploded view illustrating the support structure according to the present invention.

As shown in FIG. 1 and FIG. 2, the support structure provided by the present invention substantially comprises a connection unit 1, a base 2, at least a base hinge 3, at least a main hinge 4, at least a first auxiliary connection member 5 and at least a pair of second auxiliary connection members 6, 6'.

The connection unit 1 is a frame body having its bottom and top respectively formed with a lower end 11 and an upper end 12, wherein the lower and the upper ends 11, 12 are respectively pivoted with the base 2 and an object to be supported, e.g. a flat monitor, through the base hinge 3 and the main hinge 4 thereby forming a rotary state. As shown in FIG. 1, two lateral sides of the upper and the lower ends 12, 11 are respectively extended with a pair of lugs 13, and a concave part 14 is defined between each pair of lugs 13.

The base 2 can be disposed on a planar body, e.g. a table surface. The base 2 is pivoted with the connection unit 1 through the base hinge 3, thereby enabling the inclined angle of the connection unit 1 to be adjusted relative to the base 2.

The base hinge 3 is rotationally and oppositely installed between the lower end 11 of the connection unit 1 and the base 2. As shown in FIG. 1, two base hinges 3 are respectively pivoted with the lower lugs 13 at the left and right sides of the connection unit 1. For providing a clear and full disclosure of the technical characteristic of the base hinge 3, only the base hinge 3 at the left side of the connection unit 1 is shown in FIG. 2.

Each base hinge 3 utilizes one end of a fixed shaft rod 31 to be pivoted in a shaft hole 131 formed in the lower lug 13 and sleeve with a torsion spring 32 in the concave part 14, and the other end of the fixed shaft rod 31 sequentially passes through three second lower shaft rings 33, 33', 33", two first lower shaft rings 34, 34', a lower rack 35 installed on the base 2, then the end part of the fixed shaft rod 31 is connected with an end seal member 36, e.g. an anti-loosening nut, thereby enabling the connection unit 1 to rotate or be stopped and positioned relative to the two lower racks 35. In addition, at least an elastic member 37, e.g. a spring or disk-shaped elastic sheets in stagger arrangement, which allows the fixed shaft rod 31 to pass through can be additionally installed between an outer first lower shaft ring 34 and the lower rack 35, and a washer 38 is installed between the lower rack 35 and the end seal member 36.

Two end parts 321 of the torsion spring 32 are respectively fastened in a rack slot 352 formed on the lower rack 35 and a connection slot 133 preset at the lower end 11 of the connection unit 1, so when the connection unit 1 is rotated between the two lower racks 35 through the fixed shaft rod 31, the torsion spring 32 is enabled to store energy or release energy. The weight of the object to be supported, e.g. a flat monitor, can offset the elastic force of the torsion spring 32, thus a user can apply less force to easily rotate the connection unit 1 relative to the two lower racks 35.

The fixed shaft rod 31 is a columnar body having a noncircular cross section, the surface thereof is formed with at least a plane 311 for passing ring holes 341, 331 correspondingly formed in the two first and the three second lower shaft rings 34, 34', 33, 33', 33", and the fixed shaft rod 31 is fastened in rack holes 351 correspondingly formed at the side of the lower rack 35 which faces the fixed shaft rod 31. As such, when the inclined angle of the connection unit 1 is adjusted between the two lower racks 35, the two first and the three second lower shaft rings 34, 34', 33, 33', 33", and the fixed shaft rod 31 are prevented from being driven to rotate.

Moreover, in order to increase the wear resistant effect between adjacent surfaces of the lower lug 13 and an inner second lower shaft ring 33", the outer side of the circular shaft hole 131 of the lug 13 is fastened with a wear resistant ring 7, wherein the periphery of each wear resistant ring 7 is protrudingly formed with a tenon 71 so as to be inserted in a tenon slot 132 preset at the periphery of the shaft hole 131.

Moreover, adjacent surfaces between the lower lug 13 and the inner second lower shaft ring 33" are oppositely installed with a positioning slot 134 and a positioning tenon 333, wherein the positioning tenon 333 is received in the positioning slot 134 for defining the inclined angle of the connection unit 1 relative to the two lower racks 35, i.e. the base 2. As such, when being in a folding state, the included angle between the connection unit 1 and the base 2 is zero degree thereby forming a parallel stacking state.

The main hinge 4 is rotationally and oppositely installed between the upper end 12 of the connection unit 1 and the object to be supported, e.g. a flat monitor. As shown in FIG. 1, two main hinges 4 are respectively pivoted with the upper lugs 13 at the left and right sides of the connection unit 1; for providing a clear and full disclosure of the technical characteristic of the main hinge 4, only the main hinge 4 at the left side of the connection unit 1 is shown in FIG. 2.

Each main hinge 4 utilizes a moveable shaft rod 41 to inwardly and sequentially pass through a rack hole 421 of an upper rack 42 connected with the object to be supported, a friction ring 43, two first upper shaft rings 44, 44', three second upper shaft rings 45, 45', 45", a shaft hole 131 of the upper lug 13, and the end part of the moveable shaft rod 41 is connected with an end seal member 46, e.g. an anti-loosening nut, in the concave part 14 of the upper lug 13, thereby enabling the upper rack 42 to rotate or be stopped and positioned relative to the connection unit 1. In addition, at least an elastic member 47, e.g. a spring or disk-shaped elastic sheets in stagger arrangement arranged, which allows the moveable shaft rod 41 to pass through can be additionally installed between the upper lug 13 and the end seal member 46, and a washer 48 is installed between the elastic member 47 and the end seal member 46.

The moveable shaft rod 41 is a columnar body having a noncircular cross section, the surface thereof is formed with at least a plane 411 for respectively passing a circular rack hole 421 of the upper rack 42, a circular rod hole 441 of the two first upper shaft rings, 44, 44', a ring hole 451 formed in the three second upper shaft rings 45, 45', 45" and having a cross section corresponding to the moveable shaft rod 41, and the circular shaft hole 131 of the upper lug 13, thereby enabling the moveable shaft rod 41 to be linked to rotate through the three second upper shaft rings 45, 45', 45".

As what has been disclosed, in order to increase the wear resistant effect between adjacent surfaces of the upper rack 42 and the friction ring 43, the upper lug 13 and an outer first upper shaft ring 44, the inner wall of the rack hole 421 of the upper rack 42 and the outer wall of the shaft hole 131 of the upper lug 13 are respectively fastened with a wear resistant ring 7, wherein the periphery of each wear resistant ring 7 is protrudingly formed with a tenon 71 so as to be inserted in tenon slots 132, 422 preset at the peripheries of the shaft hole 131 and the rack hole 421.

The periphery of the rack hole 421 of the upper rack 42 is oppositely formed with a first and a second adjustment slots 423, 424 for respectively allowing a first and a second stop tenons 443, 453 protrudingly and axially formed at the peripheries of the outer first and an outer second upper shaft rings 44, 45 to be inserted and accommodated, thereby limiting the forward and backward inclined angle of the upper rack 42. In addition, the outer first upper shaft ring 44 is disposed at the outer side of the outer second upper shaft ring 45, so the two first upper shaft rings 44, 44' can be formed with a notch 444 corresponding to the movement path of the second stop tenon 453 thereby allowing the second stop tenon 453 to pass through and be inserted in the second adjustment slot 424. What shall be addressed is that the outer first upper shaft ring 44 can be disposed at the inner side of the outer second upper shaft ring 45, so the outer second upper shaft ring 45 is formed with a notch corresponding to the movement path of the first stop tenon 443 thereby allowing the first stop tenon 443 to pass through and be inserted in the first adjustment slot 423.

As such, the first stop tenon 443 of the outer first upper shaft ring 44 is served as a stop for the upper rack 42 thereby restraining the object to be supported from being rotated from a vertical state to a horizontal folding state while the object to be supported being at a higher location of the support structure. What shall be addressed is that the arrangement means of the first and the second stop tenons 443, 453 and the first and the second adjustment slots 423, 424 is not limited to the means disclosed in this embodiment, i.e. the first and the second stop tenons can be protrudingly formed on the inner surfaces of the upper racks 42, and the first and the second adjustment slots can be respectively and concavely formed at the outer surfaces of the outer first and the outer second upper shaft rings 44, 45, and the same elevation angle adjustment and stop effect can be achieved. Accordingly, when the two upper racks 42 are subject to an elevation angle adjustment process between the upper end 12 of the connection unit 1, the outer first and the outer second upper shaft rings 44, 45 and the moveable shaft rod 41 are prevented from being driven to rotate.

The first auxiliary connection member 5 is an elongated rod member connected to at least one side of the connection unit 1, as shown in FIG. 1, two sides of the connection unit 1 are respectively connected with a first auxiliary connection member 5, an upper and a lower ends of each first auxiliary connection member 5 are respectively pivoted with a shaft pin 51 so as to be respectively pivoted in an upper and a lower connection hole 442, 342 formed at the peripheries of the outer first upper and an outer first lower shaft rings 44, 34 of the main hinge 4 and the base hinge 3. As shown in FIG. 2, the distance L1 defined from the lower connection hole 342 to the center point of the fixed shaft rod 31 is greater than the distance L2 defined from the upper connection hole 442 to the center point of the moveable shaft rod 41, i.e. the distance defined from the lower end of the first auxiliary connection member 5 to the center point of the fixed shaft rod 31 is greater than the distance defined from the upper end of the first auxiliary connection member 5 to the center point of the moveable shaft rod 41.

The first auxiliary connection member 5 is pivoted in the upper and the lower connection holes 442, 342 formed at the peripheries of the outer first upper and the outer first lower shaft rings 44, 34 thereby defining a first side, and a second side is defined from the upper connection hole 442 to the center point of the moveable shaft rod 41, a third side is defined from the lower connection hole 342 to the center point of the fixed shaft rod 31, wherein the length of the third side is greater than that of the second side, and an imaginary fourth side is defined between the two center points of the moveable and the fixed shaft rods 41, 31; because the upper and the lower ends 12, 11 of the connection unit 1 restrain the locations of the moveable and the fixed shaft rods 41, 31, the lateral side of the connection unit 1 can also be defined as the fourth side, thereby substantially forming a non-parallel four-bar linkage mechanism through the first auxiliary connection member 5, the base hinge 3, the main hinge 4 and the connection unit 1. As such, when the inclined angle of the first auxiliary connection member 5 is adjusted with the connection unit 1, the first auxiliary connection member 5 utilizes the lower connection hole 342 of the first lower shaft ring 34 as a pivot for linking the first upper shaft ring 44 to reversely rotate, thereby altering the stopping location of the first stop tenon 443 in the first adjustment slot 423.

The pair of second auxiliary connection members 6, 6' are elongated rod members arranged in parallel and connected to at least one side of the connection unit 1; as shown in FIG. 1, two sides of the connection unit 1 are respectively installed with a pair of second auxiliary connection members 6, 6', wherein an upper and a lower ends of the pair of second auxiliary connection members 6, 6' are respectively pivoted with a shaft pin 61 so as to be pivoted in a pair of upper and a pair of lower connection holes 452, 332 oppositely and respectively formed at the peripheries of the three second upper and the three second lower shaft rings 45, 45', 45", 33, 33', 33" of the main hinge 4 and the base hinge 3.

The two second auxiliary connection members 6, 6' respectively define a first side and a second side, and the L3 defined between each pair of upper and lower connection holes 452, 332 of the three second upper and the three second lower shaft rings 45, 45', 45", 33, 33', 33" are the same, i.e. the upper end distance and the lower end distance of the two second auxiliary connection members 6, 6' are the same and respectively form a third side and a fourth side, thereby substantially forming a parallel four-bar linkage mechanism through the two second auxiliary connection members 6, 6', the base hinge 3 and the main hinge 4. As such, when the connection unit 1 is subject to an inclined angle adjustment process, the three second upper shaft rings 45, 45', 45" reversely rotate relative to the connection unit 1 through the parallel four-bar linkage mechanism for being kept at the same angle, and the three second upper shaft rings 45, 45', 45" drive the moveable shaft rod 41 having the noncircular cross section and the friction ring 43 to reversely rotate for being kept at the same angle, then the friction force generated between adjacent surfaces of the friction ring 43 and the upper rack 42 drives the upper rack 42 for being kept at the original elevation angle.

Referring to FIG. 2, at least one side of the connection unit 1 is preferably in parallel installed with a first auxiliary connection member 5 and a pair of second auxiliary connection members 6, 6', wherein the upper and the lower ends of the first auxiliary connection member 5 are respectively enclosed by two first upper and the two first lower shaft rings 44, 44', 34, 34', wherein the peripheries of the two first upper and the two first lower shaft rings 44, 44', 34, 34' are oppositely and respectively formed with a pair of upper and lower connection holes 442, 342; wherein one upper and one lower connection holes 442, 342 of the two first upper and the two first lower shaft rings 44, 44', 34, 34' are pivoted with the shaft pins 51 formed at the upper and the lower ends of the first auxiliary connection member 5, and the other upper and lower connection holes 442, 342 thereof allow a relay insertion pin 52 to be pivoted.

The upper and the lower ends of the pair of second auxiliary connection members 6, 6' are respectively installed with the three second upper and the three lower shaft rings 45, 45', 45", 33, 33', 33' which are arranged at intervals, the peripheries of the three second upper and the three lower shaft rings 45, 45', 45", 33, 33', 33" are oppositely formed with a pair of upper and lower connection holes 452, 332 so as to be pivoted with shaft pins 61 installed at the upper and the lower ends of the pair of second auxiliary connection members 6, 6', and the upper and the lower connection holes 452, 332, which are adjacent to each other and not pivoted with any component of the three adjacent second upper and the three lower shaft rings 45, 45', 45", 33, 33', 33" are respectively pivoted with a relay insertion pin 62.

Figure 3:
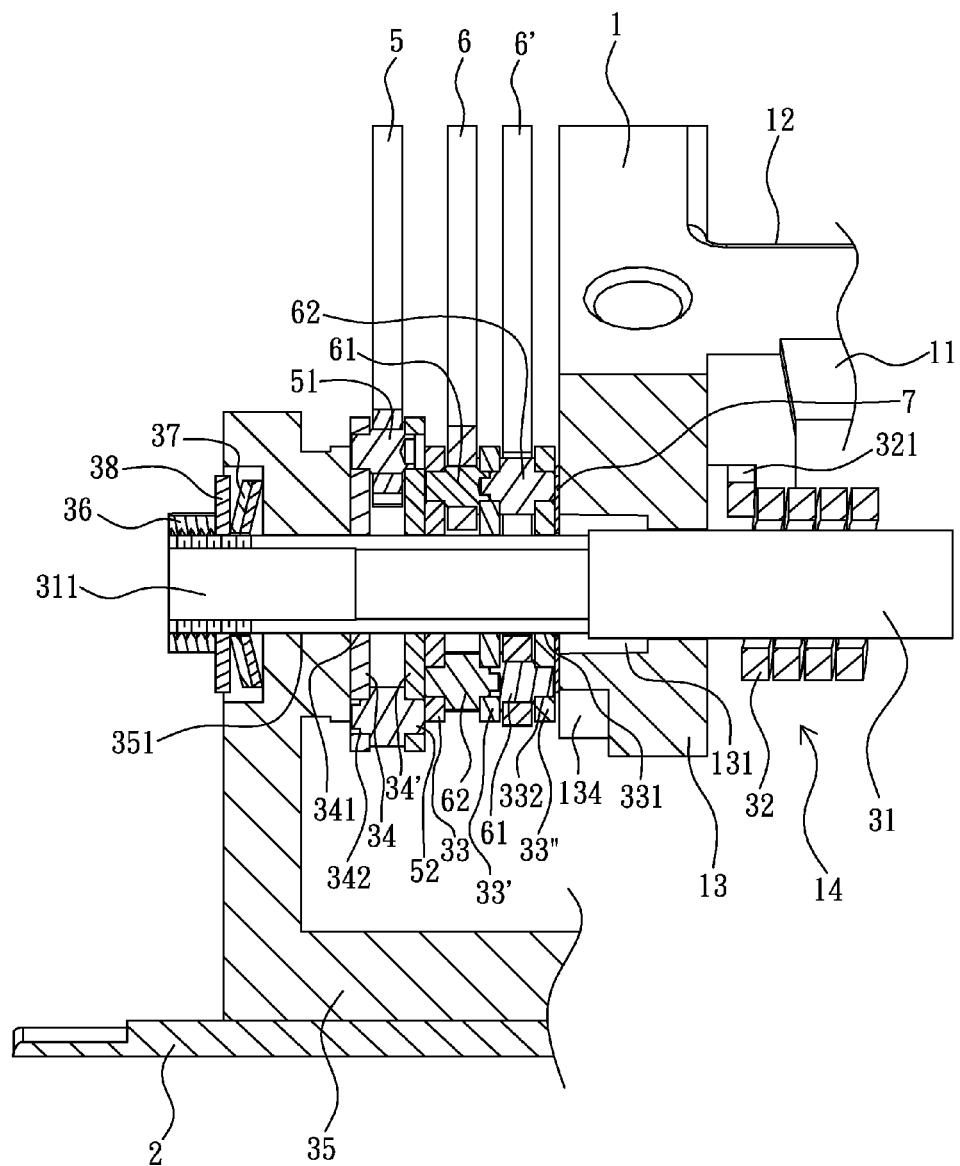
FIG. 3 is a cross sectional view illustrating the assembly of the connection unit, the base and the base hinge according to the present invention.
Figure 4:
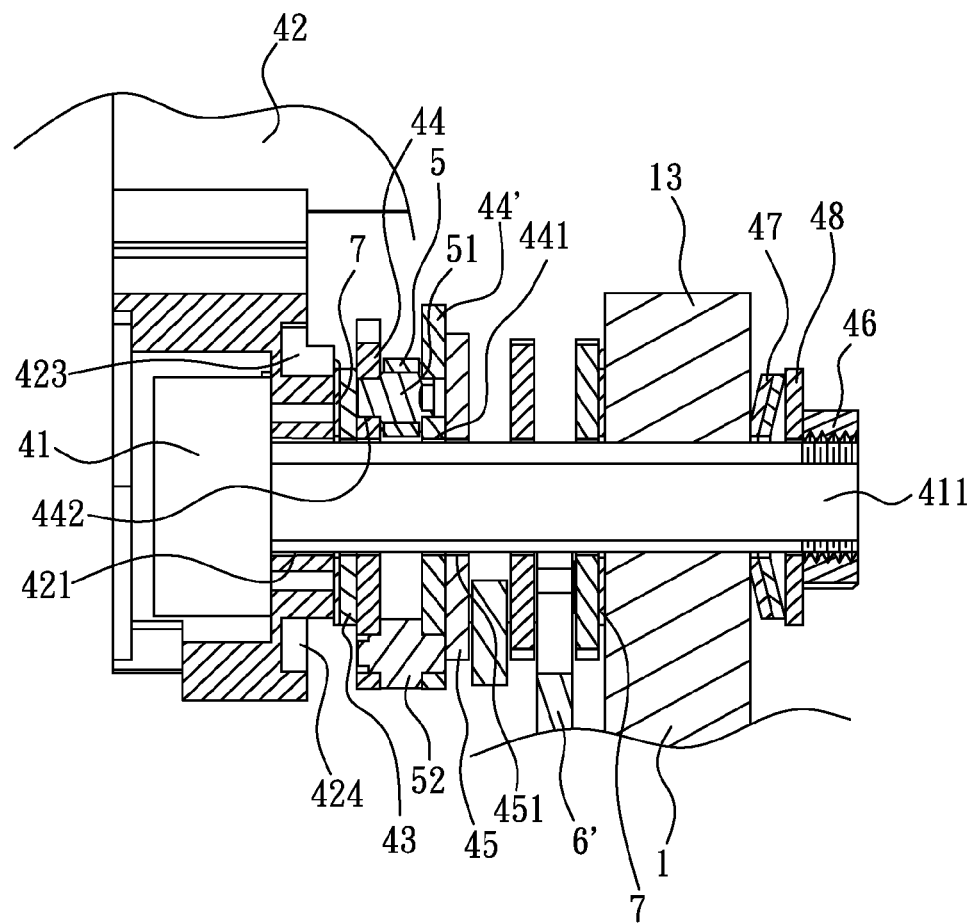
FIG. 4 is a cross sectional view illustrating the assembly of the connection unit and the main hinge according to the present invention.

As what has been disclosed above, each component and the connection relation are clearly and fully illustrated with the accompanying drawings, wherein FIG. 1 is a perspective view showing the support structure according to the present invention; FIG. 3 is a cross sectional view illustrating the assembly of the connection unit 1, the base 2 and the base hinge 3; and FIG. 4 is a cross sectional view illustrating the assembly of the connection unit 1 and the main hinge 4.

Figure 5:
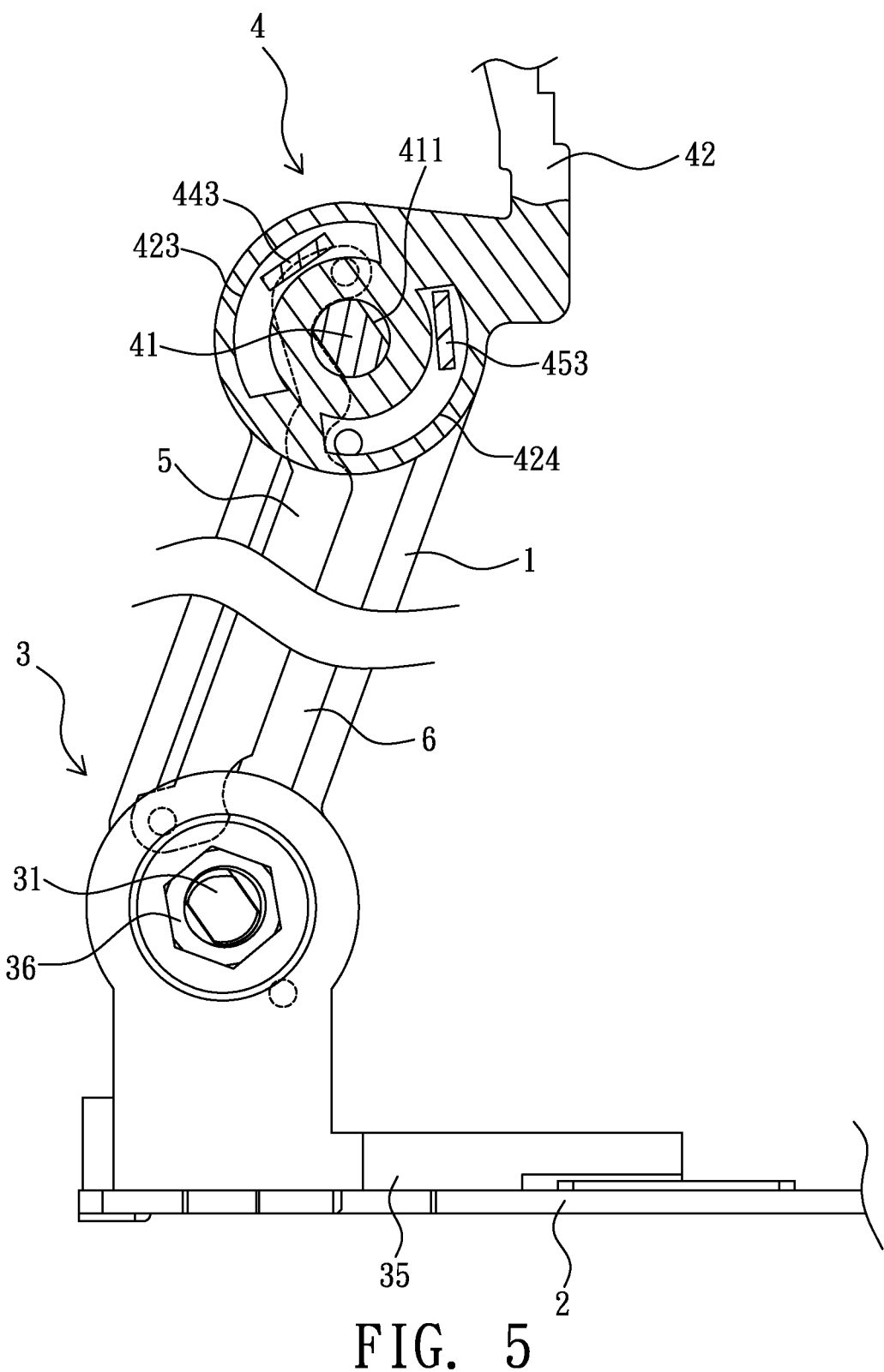
FIG. 5 is a side view illustrating the assembly of the support structure according to the present invention.

Referring to from FIG. 2 to FIG. 5, the lower rack 35 is fastened on the base 2, and the fixed shaft rod 31 of the base hinge 3 is pivoted at the lower end 11 of the connection unit 1, and passes through the three second and the two first lower shaft rings 33, 33', 33", 34, 34' and is fastened on the lower rack 35 thereby forming a fixed state. As a result, the lower end 11 of the connection unit 1 utilizes the fixed shaft rod 31 as a pivot and forms an inclined angle with the base 2. The moveable shaft rod 41 of the main hinge 4 passes through the upper rack 42, the friction ring 43, the two first and the three second upper shaft rings 44, 44', 45, 45', 45" and the upper end 12 of the connection unit 1, and the first and the second stop tenons 443, 453 of the outer first and the outer second upper shaft rings 44, 45 are respectively received in the first and the second adjustment slots 423, 424, the upper rack 42 is further connected with the object to be supported, e.g. a flat monitor, such that the upper rack 42 utilizes the moveable shaft rod 41 as the shaft core, and the backward elevation angle adjustment is processed through the first adjustment slot 423 contacting the first stop tenon 443, e.g. 25 degree, and the forward elevation angle adjustment is processed through the second adjustment slot 424 contacting the second stop tenon 453, e.g. 5 degree. As such, as shown in FIG. 5, when the object to be supported is placed at a higher location of the support structure, if being rotated in the counterclockwise direction, the upper end of the first adjustment slot 423 would abut against the first stop tenon 443 thereby restraining from being rotated from the vertical state to the horizontal folding state, so the support structure is prevented from being unstable or falling due to the gravity center of the object to be supported being shifted.

The upper and the lower ends of the first and the second auxiliary connection members 5, 6 are respectively pivoted in the upper and the lower connection holes 442, 342, 452, 332 of the two first upper and the two first lower and the three second upper and the three lower shaft rings 44, 44', 34, 34', 45, 45', 45", 33, 33', 33", and the first and the second auxiliary connection members 5, 6, 6' utilize the lower connection holes 342, 332 pivoted with the two first and the three second lower shaft rings 34, 34', 33, 33', 33" respectively as a pivot.

Figure 6:
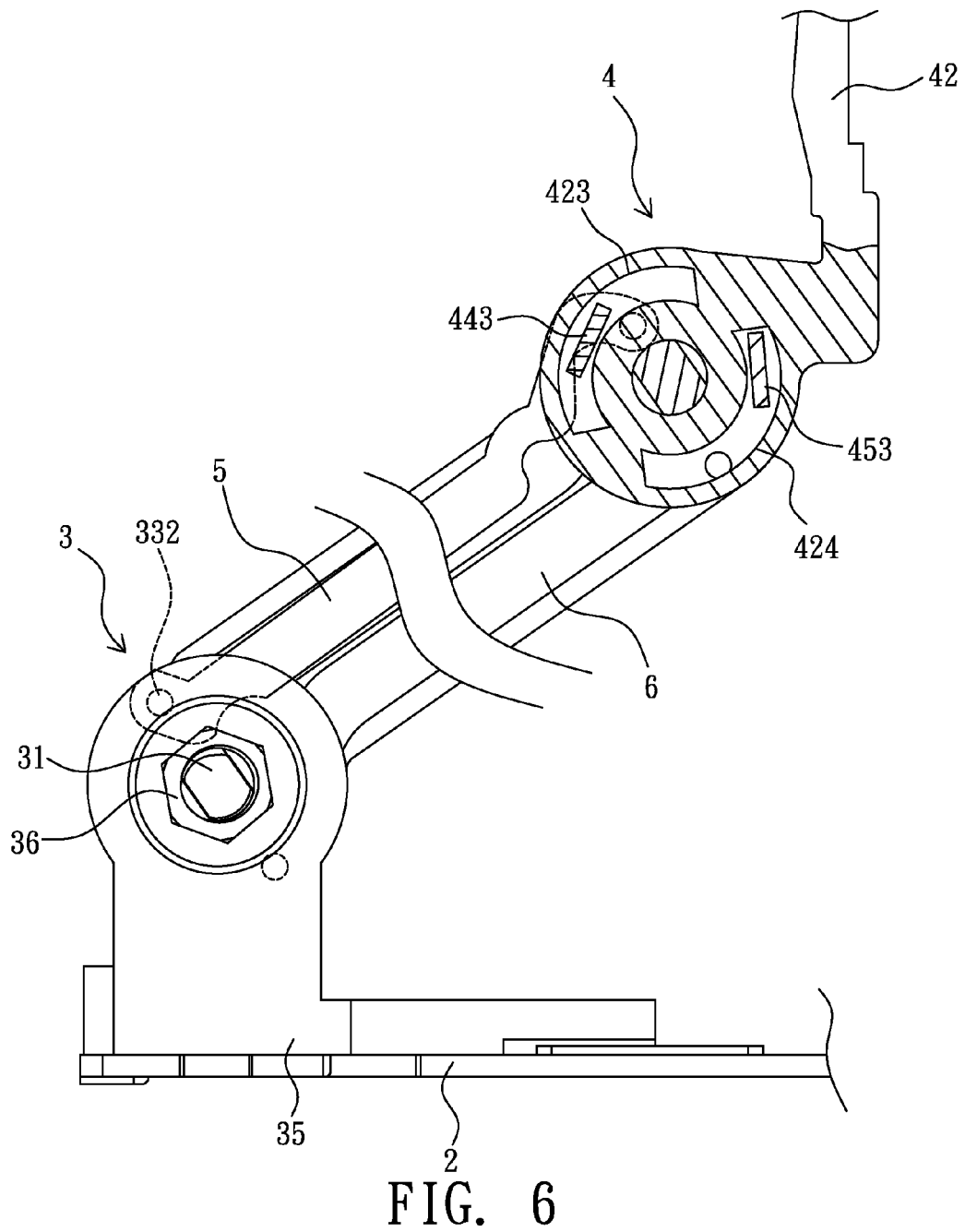
FIG. 6 is a side view illustrating the inclined angle of the support structure being adjusted according to the present invention.

As shown in FIG. 6, if the object to be supported is desired to be folded, the lower end 11 of the connection unit 1 utilizes the fixed shaft rod 31 as the pivot to rotate in the clockwise direction; at this moment, the first and the second auxiliary connection members 5, 6, 6' synchronously move with the connection unit 1, and respectively utilize the pivoted lower connection holes 342, 332 as the pivot to rotate in the clockwise direction. The non-parallel four-bar linkage mechanism which includes the first auxiliary connection member 5 enables the upper end of the first auxiliary connection member 5 to link the two first upper shaft rings 44, 44' to rotate in the counterclockwise direction, such that the first stop tenon 443 also moves in the counterclockwise direction in the first adjustment slot 423 of the upper rack 42 thereby gradually altering the stopping location. Meanwhile, the parallel four-bar linkage mechanism which includes the two second auxiliary connection members 6, 6' enables the three second upper shaft rings 45, 45', 45" to rotate in the counterclockwise direction thereby keeping the original angle, and the three second upper shaft rings 45, 45', 45" further drives the moveable shaft rod 41 and the friction ring 43 to rotate, so the friction effect applied to the upper rack 42 by the friction ring 43 allows the upper rack 42 to keep the original angle during movement. Because the distance defined from the upper end of the first auxiliary connection member 5 of the non-parallel four-bar linkage mechanism to the center point of the moveable shaft rod 41 is smaller than the distance defined from the lower end to the fixed shaft rod 31, the angle at which the two first upper shaft rings 44, 44' rotate in the counterclockwise direction is greater than the angle at which the three second upper shaft rings 45, 45', 45" of the parallel four-bar rotates, thereby gradually altering the stopping location where the first stop tenon 443 stops the upper rack 42, and keeping the original angle of the three second upper shaft rings 45, 45', 45" and the friction ring 43.

Figure 7:
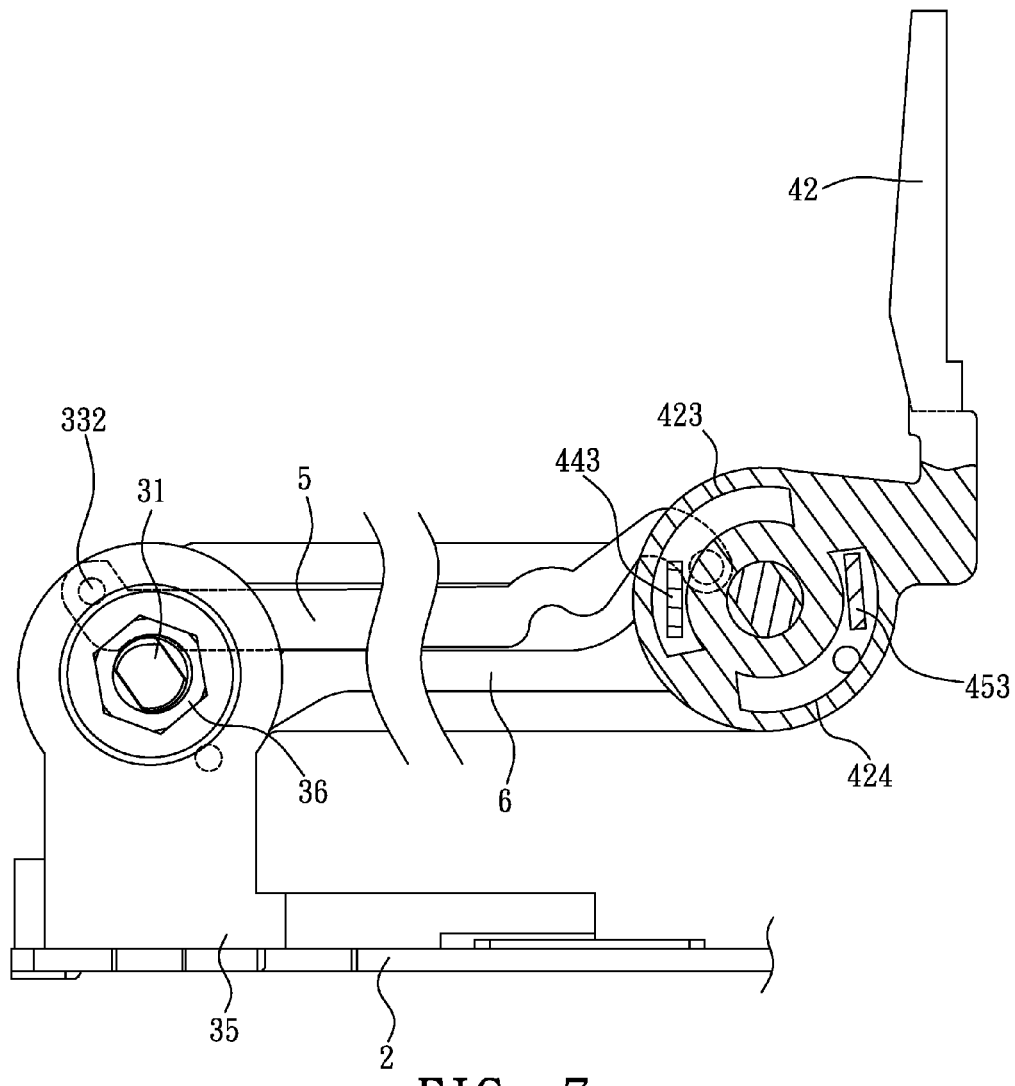
FIG. 7 is a side view illustrating the support structure being adjusted to a folding state according to the present invention.
Figure 8:
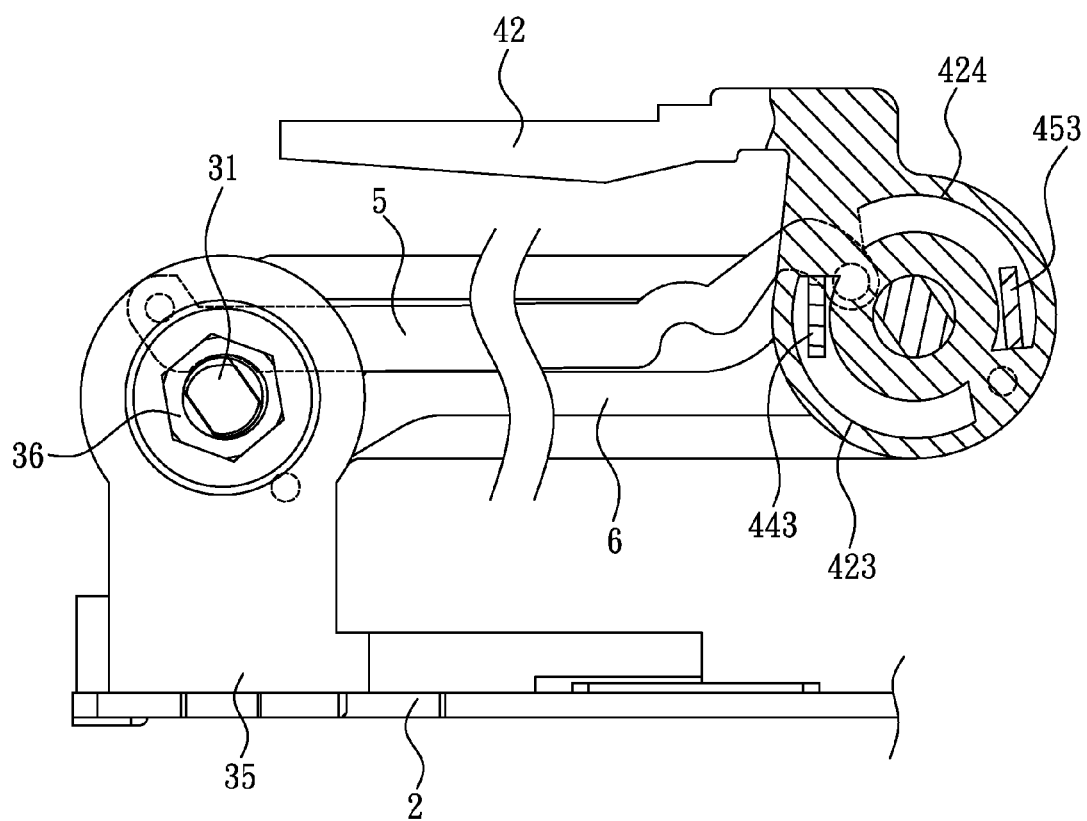
FIG. 8 is a side view illustrating the upper rack being manually rotated and folded according to the present invention.

As shown in FIG. 7, when the connection unit 1 is in a parallel folding state relative to the base 2, the upper rack 42 is kept at the original vertical state through the parallel four-bar, and the first stop tenon 443 alters the stopping location through the non-parallel four-bar. At this moment, an operator can manually rotate the upper rack 42, which is connected with the object to be supported, in the counterclockwise direction till the upper rack 42 being in a horizontal folding state relative to the connection unit 1 as shown in FIG. 8, thereby greatly shortening the height of the support structure and facilitating package and transportation.

Figure 9:
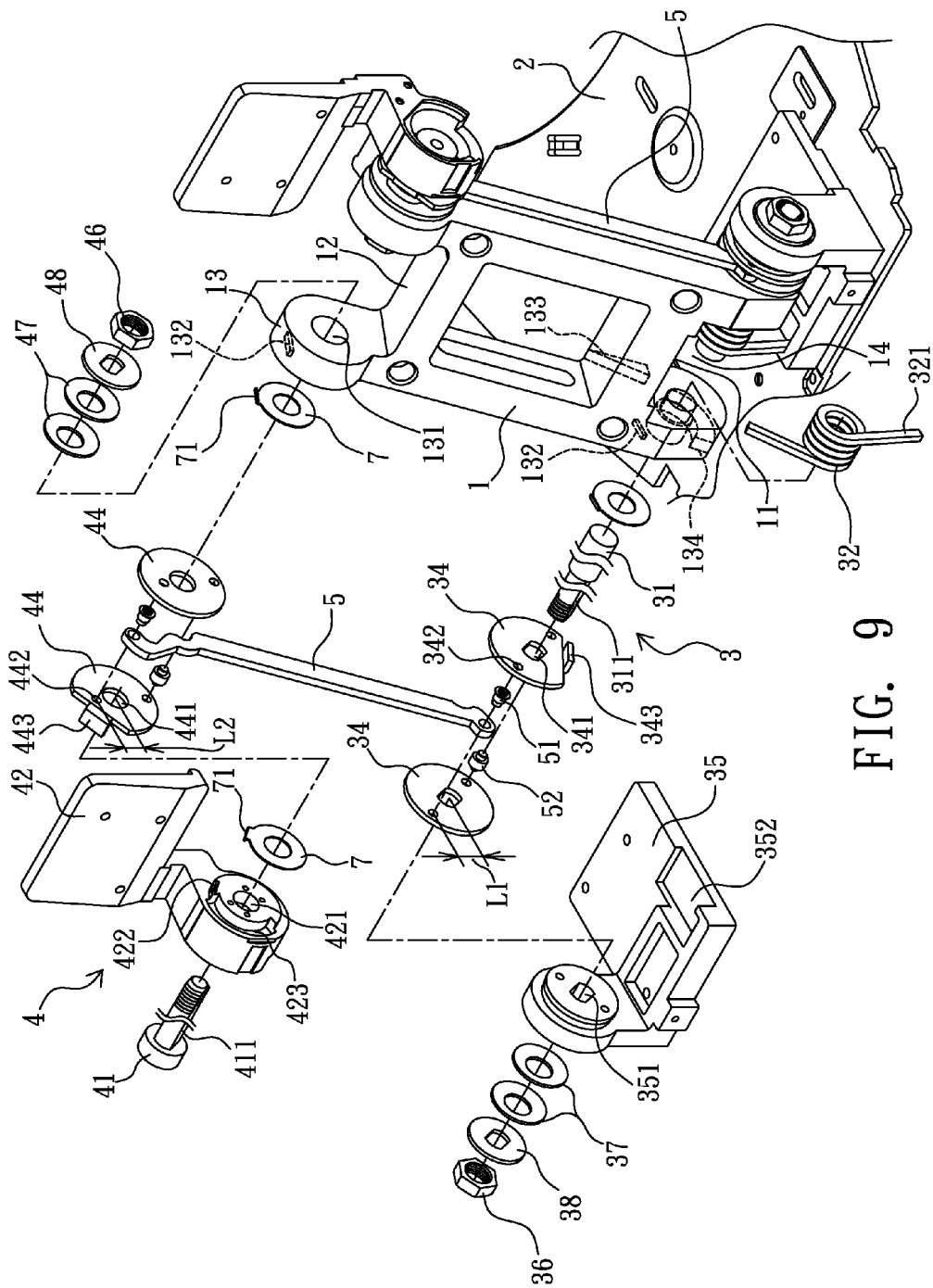
FIG. 9 is a perspective exploded view showing the support structure according to the second embodiment of the present invention.

FIG. 9 to FIG. 13 are drawings for illustrating the second embodiment of the present invention, the same components and codes used in the previous embodiment are adopted in this embodiment therefore no further illustration is provided. As shown in FIG. 9, the difference of technical feature between the second and the previous embodiments is that the second auxiliary connection member, the second upper and lower shaft rings, the friction ring and the second adjustment slot are not provided in the second embodiment.

A wear resistance ring 7 is respectively installed between the upper and the lower lugs 13 and the first upper and the first lower shaft rings 44, 34, and adjacent surfaces between the lower lug 13 and the first lower shaft ring 34 are oppositely formed with a positioning slot 134 and a positioning tenon 343, wherein the positioning tenon 343 is received in the positioning slot 134 for defining the inclined angle of the connection unit 1 relative to the two lower racks 35. i.e. the base 2. In addition, the first upper shaft ring 44 itself, which is adjacent to the upper rack 42, has a function of acting like a friction ring, so when the first upper shaft ring 44 is rotated, the first upper shaft ring 44 applies a friction force to the upper rack 42 so as to further synchronously drive the upper rack 42 connected with the object to be supported to rotate, thereby gradually altering the inclined angle and the location of gravity center of the object to be supported.

Figure 10:
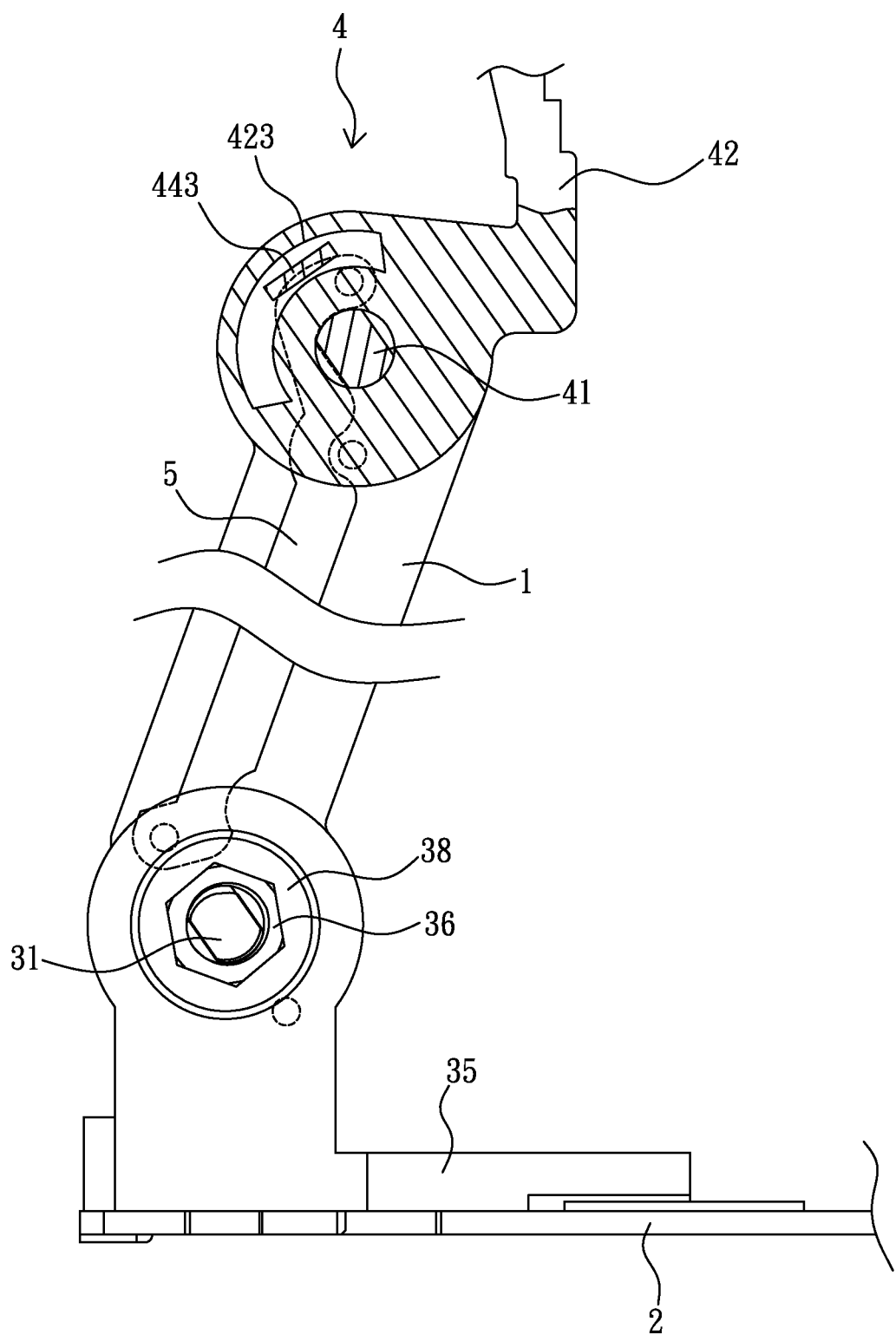
FIG. 10 is a side view showing the assembly of the support structure according to the second embodiment of the present invention.

Referring to FIG. 9 and FIG. 10, the lower rack 35 is fastened on the base 2, and the fixed shaft rod 31 of the base hinge 3 is pivoted at the lower end 11 of the connection unit 1, and passes through the first lower shaft ring 34 and is fastened on the lower rack 35 thereby forming a fixed state. The lower end 11 of the connection unit 1 utilizes the fixed shaft rod 31 as a pivot and forms an inclined angle with the base 2. The moveable shaft rod 41 of the main hinge 4 passes through the upper rack 42, the first upper shaft ring 44 and the upper end 12 of the connection unit 1, and the first stop tenon 443 of the first upper shaft ring 44 is received in the first adjustment slot 423, the upper rack 42 is further connected with the object to be supported, e.g. a flat monitor, such that the upper rack 42 utilizes the moveable shaft rod 41 as the shaft core, and the elevation angle adjustment is processed through the first adjustment slot 423 contacting the first stop tenon 443. As such, as shown in FIG. 10, when the object to be supported placed at a higher location of the support structure is desired to be rotated in the counterclockwise direction, the upper end of the first adjustment slot 423 would abut against the first stop tenon 443 and is restrained from being rotated from the vertical state to the horizontal folding state, thereby preventing the support structure from being unstable or falling due to the gravity center of the object to be supported being shifted.

The upper and the lower ends of the first auxiliary connection member 5 are pivoted in the upper and the lower connection holes 442, 342 of the first upper and the first lower shaft rings 44, 34; and the first auxiliary connection member 5 utilizes the lower connection hole 342, which is pivoted with the first lower shaft ring 34, as the pivot. The distance L1 defined from the lower connection hole 342 to the center point of the fixed shaft rod 31 is greater than the distance L2 defined from the upper connection hole 442 to the center point of the moveable shaft rod 41, i.e. the distance defined from the lower end of the first auxiliary connection member 5 to the center point of the fixed shaft rod 31 is greater than the distance defined from the upper end of the first auxiliary connection member 5 to the center point of the moveable shaft rod 41. Therefore, a non-parallel four-bar linkage mechanism is substantially formed through the first auxiliary connection member 5, the base hinge 3, the main hinge 4 and the connection unit 1.

Figure 11:
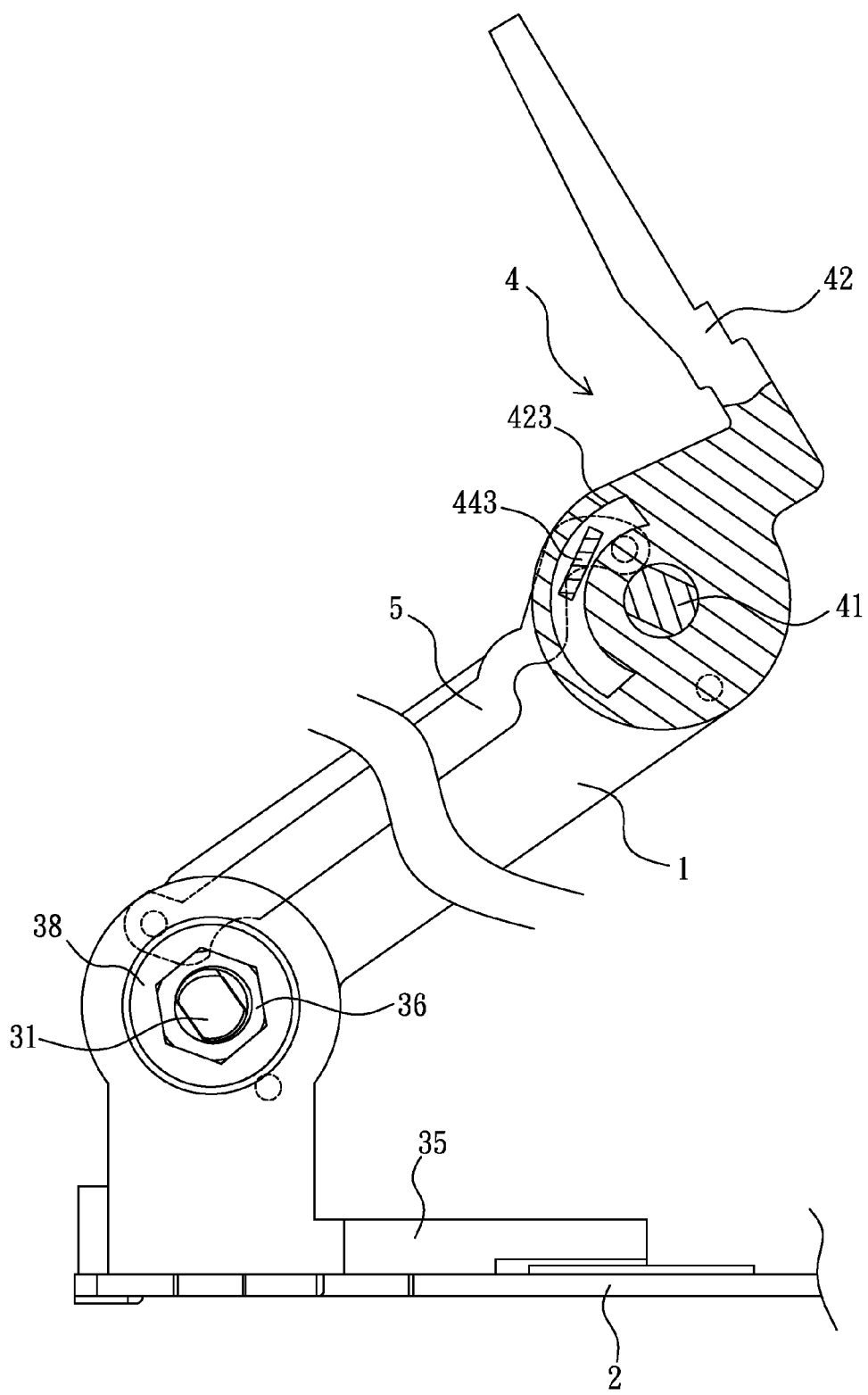
FIG. 11 is a side view illustrating the inclined angle of the support structure being adjusted according to the second embodiment of the present invention.

As shown in FIG. 11, if the object to be supported is desired to be folded, the lower end 11 of the connection unit 1 utilizes the fixed shaft rod 31 as the pivot to rotate in the clockwise direction; at this moment, the first auxiliary connection member 5 synchronously moves with the connection unit 1, and utilizes the pivoted lower connection hole 342 as the pivot to rotate in the clockwise direction; because the non-parallel four-bar linkage mechanism is formed through the first auxiliary connection member 5, the connection unit 1, the base hinge 3 and the main hinge 4, the upper end of each first auxiliary connection member 5 links the first upper shaft ring 44 to rotate in the counterclockwise direction thereby enabling the first stop tenon 443 to move in the first adjustment slot 423 of the upper rack 42 in the counterclockwise direction, and gradually altering the stopping position, and the friction effect applied to the upper rack 42 through the first upper shaft ring 44 enables the object to be supported connected with the upper rack 42 to synchronously rotate in the counterclockwise direction, thereby gradually altering the inclined angle and the location of gravity center.

Figure 12:
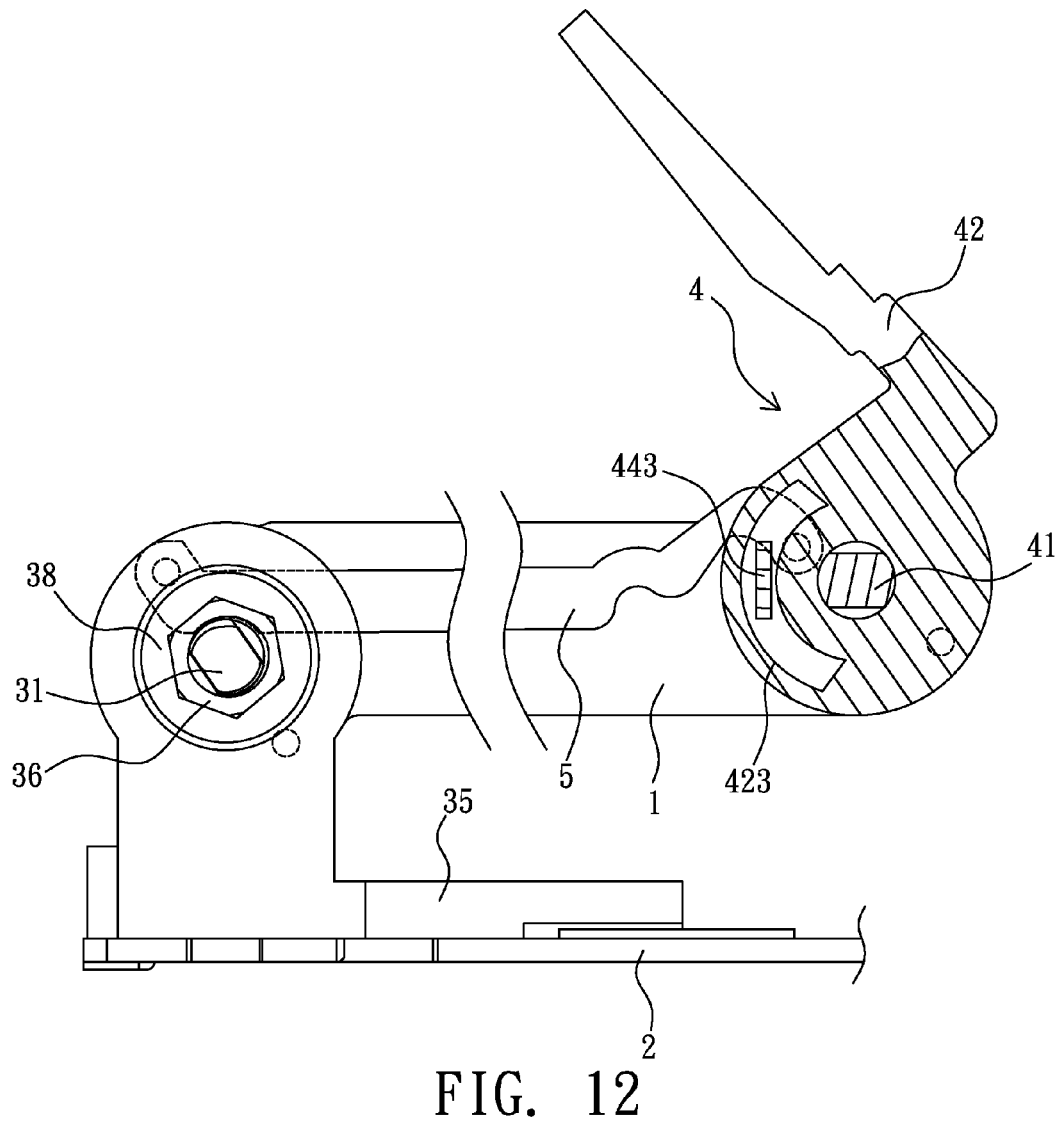
FIG. 12 is a side view illustrating the support structure being adjusted to a folding state according to the second embodiment of the present invention.
Figure 13:
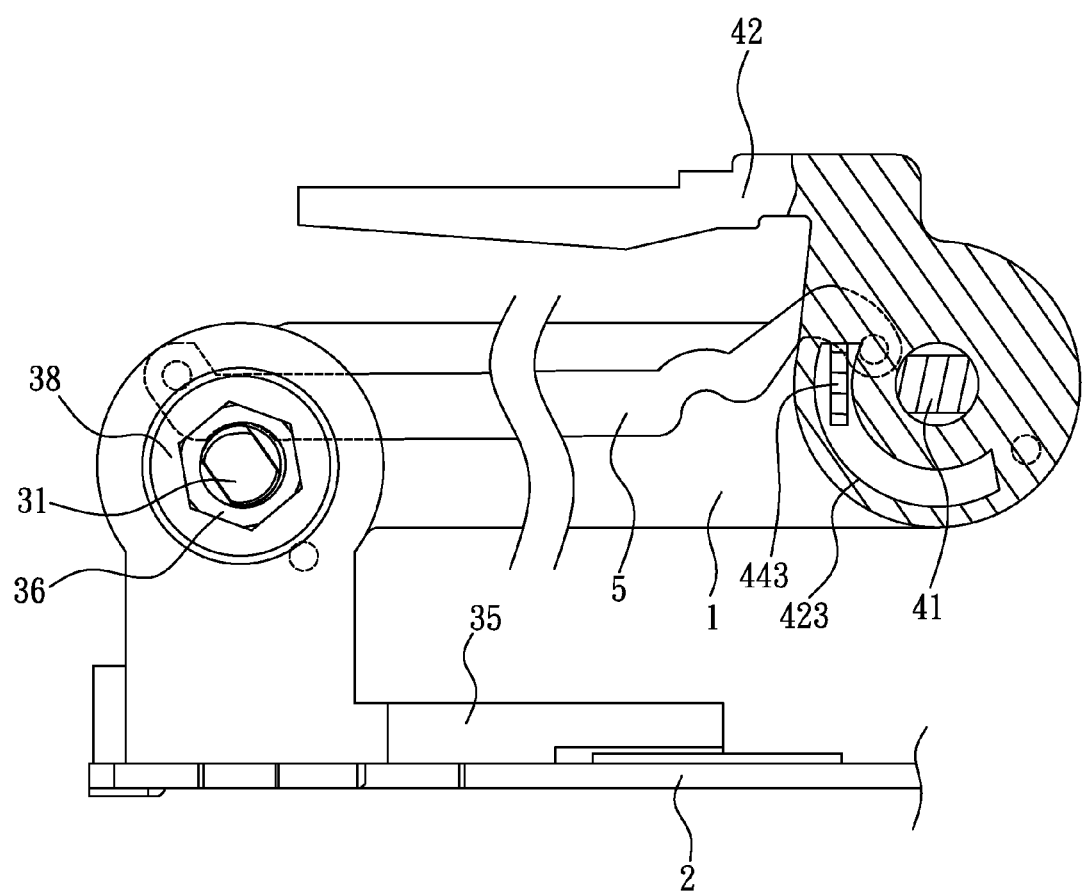
FIG. 13 is a side view illustrating the upper rack being manually rotated and folded according to the present invention.

As shown in FIG. 12, when the connection unit 1 is in a parallel folding state relative to the base 2, the upper rack 42 is rotated to an inclined angle along the counterclockwise direction. At this moment, an operator can manually rotate the upper rack 42, which is connected with the object to be supported, in the counterclockwise direction till the upper rack 42 being in a horizontal folding state relative to the connection unit 1 as shown in FIG. 13, thereby greatly shortening the height of the support structure and facilitating package and transportation.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A support structure, comprising:
   a connection unit, having an upper and a lower ends;
   a base;
   at least a base hinge, each base hinge having a fixed shaft rod, a first end of the fixed shaft rod is pivotally connected to the lower end of the connection unit and a lower rack installed on the base, an inclined angle of the connection unit being able to be adjusted relative to the base, and a second end of the fixed shaft rod being inserted through at least one first lower shaft ring and at least one second lower shaft ring;
   at least a main hinge, each main hinge utilizing a moveable shaft rod to be respectively pivoted at the upper end of the connection unit and an upper rack connected with an object to be supported, an elevation angle of the upper rack being able to be adjusted relative to the connection unit; wherein the moveable shaft rod being inserted through at least one first upper shaft ring and at least one second upper shaft ring capable of being linked with the moveable shaft rod, and the upper rack and the at least one first upper shaft ring being oppositely formed with a first adjustment slot and a first stop tenon, the first stop tenon being inserted in the first adjustment slot for serving as a stop for said upper rack;
   at least a first auxiliary connection member, installed in parallel with at least one side of the connection unit, an upper end and a lower end of each first auxiliary connection member being pivotally connected to an upper connection hole and a lower connection hole formed at peripheries of the at least one first upper and the at least one first lower shaft rings respectively, and a distance defined from the lower connection hole to a center point of the fixed shaft rod being greater than a distance defined from the upper connection hole to a center point of the moveable shaft rod; and
   at least a pair of second auxiliary connection members, disposed adjacent to the first auxiliary connection member, and installed in parallel and located on at least one side of the connection unit, an upper end and a lower end of each pair of second auxiliary connection members being respectively pivoted in a pair of upper and lower connection holes oppositely and radially formed on the at least one second upper and the at least one second lower shaft rings, and a distance between each pair of lower connection holes being the same as a distance between each pair of upper connection holes;
   wherein, when the connection unit is folded towards the base, the first auxiliary connection member reversely links the first upper shaft ring to rotate gradually altering a stopping location, and the pair of second auxiliary connection members enable the at least one second upper shaft ring to reversely rotate thus keeping an original angle and driving the upper rack to keep the original angle during a folding process.

2. The support structure as claimed in claim 1, wherein a second stop tenon and a second adjustment slot are oppositely formed with the at least one second upper shaft ring and said upper rack, the second stop tenon is inserted in the second adjustment slot for enabling said upper rack to be adjusted with a forward angle adjustment relative to said connection unit.

3. The support structure as claimed in claim 2, wherein said second stop tenon is protrudingly formed on said at least one second upper shaft ring, said second adjustment slot is formed on said upper rack, said at least one first upper shaft ring is disposed at an outer side of said at least one second upper shaft ring, and said at least one first upper shaft ring is formed with a notch corresponding to a movement path of said second stop tenon of said at least one second upper shaft ring, thereby allowing said second stop tenon to be inserted into said second adjustment slot of said upper rack.

4. The support structure as claimed in claim 1, wherein said first stop tenon is protrudingly formed on said at least one first upper shaft ring, said first adjustment slot is formed on said upper rack, said at least one first upper shaft ring is disposed at an inner side of said at least one second upper shaft ring, and said at least one second upper shaft ring is formed with a notch corresponding to a movement path of said first stop tenon, thereby allowing said first stop tenon of said outer first upper shaft ring to pass through and be inserted in said first adjustment slot of said upper rack.

5. The support structure as claimed in claim 1, wherein said main hinge further includes a friction ring sleeved on said moveable shaft rod and capable of being linked with said moveable shaft rod, the friction ring is disposed adjacent to said upper rack.

6. The support structure as claimed in claim 1, wherein the upper and the lower ends of said first auxiliary connection member are respectively connected with a shaft pin so as to be pivoted in upper and lower connection holes formed at the peripheries of said at least one first upper and said at least one first lower shaft rings of said main hinge and said base hinge; the upper and the lower ends of said pair of second auxiliary connection members are respectively connected with a shaft pin so as to be pivoted in upper and lower connection holes formed at peripheries of said at least one second upper and said at least one second lower shaft rings of said main hinge and said base hinge.

7. The support structure as claimed in claim 1, wherein the at least one first upper shaft ring includes two first upper shaft rings and the at least one first lower shaft ring includes two first lower shaft rings, the upper and the lower ends of said first auxiliary connection member are enclosed by said two first upper and said two first lower shaft rings, wherein peripheries of said two first upper and said two first lower shaft rings are oppositely formed with a pair of upper and lower connection holes; wherein one upper connection hole and one lower connection are pivoted with a shaft pin formed at the upper and the lower ends of said first auxiliary connection member, and the other upper and lower connection holes thereof allow a relay insertion pin to be pivoted; the at least one second upper shaft ring includes three second upper shaft rings and the at least one second lower shaft ring includes three second lower shaft rings, the upper and the lower ends of said pair of second auxiliary connection members are respectively installed with the three second upper and the three second lower shaft rings arranged at intervals, peripheries of the three second upper and the three second lower shaft rings are oppositely formed with a pair of upper and lower connection holes so as to be pivoted with the shaft pin installed at the upper and the lower ends of said pair of second auxiliary connection members, and the upper and the lower connection holes, which are adjacent and not pivoted, of the three adjacent second upper and the thee second lower shaft rings are respectively pivoted with a relay insertion pin.

8. The support structure as claimed in claim 1, two lateral sides of the upper and the lower ends of said connection unit are respectively extended with a pair of upper and lower lugs, and a concave part is defined between each pair of upper and lower lugs.

9. The support structure as claimed in claim 1, wherein a wear resistant ring is respectively installed between adjacent surfaces of the upper end of said connection unit and said at least one second upper shaft ring, the lower end of said connection unit and said at least one inner second lower shaft ring, wherein the periphery of the wear resistant ring is protrudingly formed with a tenon so as to be inserted in tenon slots preset at the upper and the lower ends of said connection unit.

10. The support structure as claimed in claim 1, wherein adjacent surfaces between the lower end of said connection unit and said at least one second lower shaft ring are oppositely installed with a positioning slot and a positioning tenon, wherein the positioning tenon is received in the positioning slot for defining the inclined angle of said connection unit relative to said lower rack.

11. The support structure as claimed in claim 5, wherein adjacent surfaces of said upper rack and said friction ring are installed with a wear resistant ring, wherein the periphery of the wear resistant ring is protrudingly formed with a tenon so as to be inserted in a tenon slot preset on said upper rack.

* * * * *